US009778687B1

(12) United States Patent
Rajagopalan et al.

(10) Patent No.: US 9,778,687 B1
(45) Date of Patent: Oct. 3, 2017

(54) OVER-MOLD FOAM ENCLOSURE

(71) Applicant: Amazon Technologies, Inc., Seattle, WA (US)

(72) Inventors: Vigneswaran Rajagopalan, Sunnyvale, CA (US); David Eric Peters, San Jose, CA (US); Conan Zhang, Baldwin Park, CA (US)

(73) Assignee: Amazon Technologies, Inc., Seattle, WA (US)

(*) Notice: Subject to any disclaimer, the term of this patent is extended or adjusted under 35 U.S.C. 154(b) by 51 days.

(21) Appl. No.: 14/733,799

(22) Filed: Jun. 8, 2015

Related U.S. Application Data

(60) Provisional application No. 62/090,825, filed on Dec. 11, 2014.

(51) Int. Cl.
*G06F 3/041* (2006.01)
*H01L 21/44* (2006.01)
*H05K 1/03* (2006.01)
*G06F 1/16* (2006.01)
*B29C 45/14* (2006.01)
*B29K 75/00* (2006.01)
*B29L 31/34* (2006.01)

(52) U.S. Cl.
CPC ...... *G06F 1/1626* (2013.01); *B29C 45/14311* (2013.01); *B29C 45/14639* (2013.01); *G06F 1/1635* (2013.01); *G06F 3/0412* (2013.01); *B29K 2075/00* (2013.01); *B29L 2031/3481* (2013.01)

(58) Field of Classification Search
CPC .... G06F 1/1626; G06F 1/1635; G06F 3/0412; B29C 45/14311; B29C 45/14639
USPC ......... 438/124, 106, 109; 345/173; 174/256; 428/45; 257/693
See application file for complete search history.

(56) References Cited

U.S. PATENT DOCUMENTS

| 6,440,772 B1* | 8/2002 | Smith ................... H01L 21/565 257/E21.504 |
| 9,275,930 B2* | 3/2016 | Mashimo ............... H01L 21/565 |
| 2003/0127248 A1* | 7/2003 | Kuo ................... B29C 45/14639 174/256 |
| 2010/0065960 A1* | 3/2010 | Mino .................... H01L 21/565 257/693 |
| 2010/0285260 A1* | 11/2010 | Bookbinder .............. B32B 3/02 428/45 |
| 2014/0308469 A1* | 10/2014 | Aida ................. B29C 45/14434 428/38 |

(Continued)

*Primary Examiner* — Dao H Nguyen
(74) *Attorney, Agent, or Firm* — Lee & Hayes, PLLC

(57) ABSTRACT

The disclosure describes methods of fabricating a single-piece housing for an electronic device using an injection molding process. Illustrative fabrication processes describe variations of positioning internal components of an electronic device into a mold enclosure and injecting a foam material to produce a single-piece housing that surrounds the internal components. The single-piece housing may be fabricated to provide the electronic device with at least some buoyancy, as well a means to expel thermal radiation emanating from internal components. Further, the fabricated single-piece housing provides enough structural rigidity to protect internal components of the electronic device from damage, while retaining some malleability to flex without damage when an external pressure is applied.

20 Claims, 9 Drawing Sheets (Exploded View of Section B-B)

(56) References Cited

U.S. PATENT DOCUMENTS

2014/0327624 A1* 11/2014 Srinivas ................ G06F 1/1626
　　　　　　　　　　　　　　　　　　　345/173

* cited by examiner (Section A-A)

(Exploded View of Section B-B)

(Section C-C)

FIG. 5B (Exploded View of Section D-D)

FIG. 5C (Section D-D)

OVER-MOLD FOAM ENCLOSURE

CROSS-REFERENCE TO RELATED APPLICATION

This application claims priority to a commonly owned U.S. Provisional Patent Application 62/090,825 filed on Dec. 11, 2014, and entitled "Product Enclosure," which is herein incorporated by reference in its entirety.

BACKGROUND

Fabrication of product enclosures can pose several challenges to the development of electronic devices. Functionally, product enclosures are primarily responsible for protecting internal components of an electronic device from damage, while also facilitating at least some user interaction with features of the electronic device. Commercially, product enclosures perform these functions while also maintaining a level of aesthetic appeal that would capture consumer attention. Subsequently, product enclosures can become complex parts that include many features, such as snaps, bosses, apertures, and other features, which are difficult to manufacture within design tolerances and sometimes difficult to assemble. A complex assembly of parts or a need for highly tooled manufacturing steps can be economically burdensome and prohibitively time consuming. Historically, the use of molded plastic enclosures can help control manufacturing complexity by reducing the number of parts required for assembly.

BRIEF DESCRIPTION OF THE DRAWINGS

The detailed description is described with reference to accompanying figures. In the figures, the left-most digit(s) of the reference number identifies the figure in which the reference number first appears. The same reference number in different figures indicates similar or identical items.

FIG. 1A is a top plan view of the electronic device. FIG. 1B is a bottom end elevation view of the electronic device. FIG. 1C is a cross-section view through Section A-A of FIG. 1A and illustrates the self-skinning layers of the foam material, as well as the internal components of the electronic device.

FIG. 2A is a top plan view of an example mold enclosure. FIG. 2B is an exploded cross-sectional view through Section B-B of FIG. 2A and illustrates the internal components of the electronic device being positioned within a mold enclosure formed by two mold complementary mold tools. FIG. 2C is a cross-sectional view through Section C-C of FIG. 2A and illustrates pressure release vents that are included as part of the first mold tool.

FIG. 3A is a top plan view of the example configuration. FIG. 3B is a bottom end elevation view of the first mold tool at the I/O interface aperture. The internal components and the I/O interface component is omitted from FIG. 3B for clarity.

FIG. 4A is top plan view of the electronic device. FIG. 4B is a bottom end elevation view of the electronic device.

FIGS. 5A, 5B, and 5C illustrate an example configuration of using an injection molding process to fabricate an air-tight single-piece housing that combines a preconfigured bezel and a molded part. FIG. 5A is a top plan view of mold enclosure used to create a product enclosure that combines a preconfigured bezel with a molded part. (Note that the bezel of the electronic device has been omitted from this view for clarity). FIG. 5B is an exploded cross-sectional view through Section D-D of FIG. 5A and depicts the arrangement of the mold tool and the preconfigured bezel. FIG. 5C is a cross-sectional view through Section D-D of FIG. 5A and depicts the mold tool being placed in position over the bezel.

DETAILED DESCRIPTION

Figure 1A:
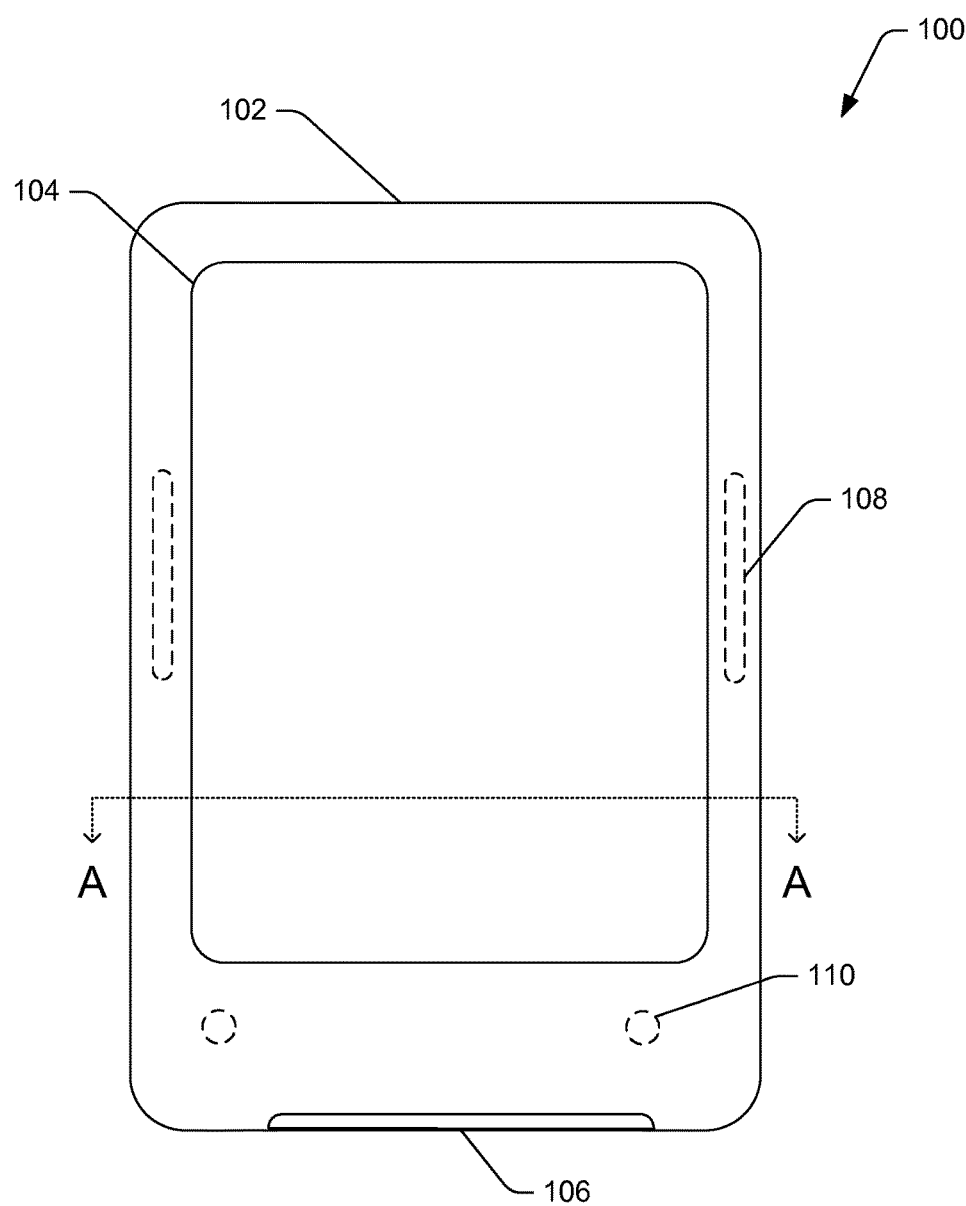
FIGS. 1A, 1B, and 1C illustrate an example electronic device that incorporates an enclosure fabricated using a foam over-mold process.

This disclosure generally describes fabricating a product enclosure for an electronic device using an illustrative injection molding process. The illustrative fabrication process, as discussed herein, involves molding a product enclosure around one or more internal components of an electronic device. The product enclosure, as discussed herein, is a single-piece electronic device housing that contains internal components of the electronic device, such as a printed circuit board, input/output interfaces, a display screen, a battery, and/or other internal components. The enclosure can include apertures for input/outputs, the display screen, speakers, microphones, and/or other components.

The illustrative fabrication process can accommodate different arrangements of internal components and preconfigured parts that make up the electronic device. In some embodiments, the product enclosure may comprise of a bezel that is preconfigured to couple with a display screen and/or other internal components of the electronic device. In this embodiment, the fabrication process can be used to mold a product enclosure that physically connects with edges of the bezel to produce an air-tight single-piece enclosure that surrounds the internal components of the electronic device. In various examples, apertures for inputs/outputs, a display screen, speakers, microphones, and/or other components can be incorporated on the bezel. In other embodiments, at least some apertures can be incorporated on the molded component, during the molding process.

In another embodiment, the product enclosure may comprise of an arrangement of internal components and/or a display screen without the inclusion of a bezel. In this embodiment, the fabrication process can be used to mold a product enclosure that surrounds the arrangement of internal components and/or the display screen to produce an air-tight single-piece enclosure. In some examples, apertures can be incorporated on the molded component during the molding process to accommodate input/outputs, a display screen, speakers, microphones, and/or other components.

The fabrication techniques described herein use an injection molding manufacturing process. Injection molding is a manufacturing process that produces parts by injecting a polymer material into a mold enclosure. The polymer material is forced into the mold enclosure where it adopts the configuration of the mold enclosure. The term mold enclosure, as used herein, describes a sealed enclosure that can be formed by a physical connection of two or more complementary parts. In some examples, the mold enclosure can be formed by two complementary mold tools. In other examples, the mold enclosure can be formed by the physical connection of a mold tool with a fabricated part of the electronic device, such as a bezel.

In some embodiments, the injection molding process can include a high pressure injection of polymer material at a high temperature. The polymer material subsequently cools and solidifies to adopt the configuration of the mold enclosure. In other examples, the injection molding process can include a high pressure injection of a polymer material at or near room temperature.

In various examples, the injection molding process can use one or more different types of polymer materials. In some examples, the polymer material can include an amorphous polymer, an elastomeric polymer or polyurethane foam. In at least one example, the polyurethane foam is a self-skinning foam that can be injected into the mold enclosure at room temperature. The term self-skinning, as discussed herein, is used to describe a type of foam that produces a high-density skin and a low-density core once it solidifies. An advantage of self-skinning foam is that it retains an overall low density, thus enabling at least some level of buoyancy. Another advantage of self-skinning foam is that it is flexible foam which is malleable when pressure is applied. In some examples, an additive can be included with the foam material to control a level of translucency.

As further described in more detail below, the fabrication process described herein provide a means of efficiently fabricating a single-piece housing that caters for different arrangements of internal components while supporting device functionality and maintaining a consistent level of consumer appeal. In addition, by fabricating a single-piece housing, the overall assembly process is simplified by removing any use for snaps, bosses, fasteners, screws or other assembly fixtures.

Figure 1B:
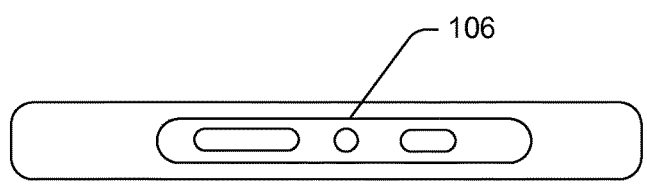

FIGS. 1A and 1B illustrate an example electronic device that incorporates an air-tight single-piece housing that surrounds an arrangement of internal components of the electronic device. An advantage of forming an air-tight product enclosure is that internal components of the electronic device can be protected from water egress, which in part also helps develop buoyancy characteristics for the single-piece housing. The buoyancy characteristics are additionally based at least in part on the characteristics of the polymer material used to form the product enclosure. These characteristics are discussed in more detail below in the detailed description corresponding to at least FIG. 2.

In some examples, the single-piece housing further includes apertures formed during the molding process to accommodate a display screen and an input/output interface component. The corresponding fabrication process is discussed in more detail below in the detail description corresponding to at least FIG. 2. FIG. 1A illustrates an example top plan view of an electronic device 100 with a single-piece housing 102. In FIG. 1A the electronic device 100 is represented as an electronic book reader device. In other examples, the electronic device 100 can include, but is not limited to, a remote control, a mobile device, an electronic book reader device, a tablet computer, a laptop computer, television unit, a portable global positioning system (GPS) unit, or any other electronic device requiring a product enclosure.

In the illustrated example, the single-piece housing 102 includes at least two apertures (e.g., two cutouts) to accommodate a display screen 104 and an input/output (I/O) interface 106. FIG. 1B is a bottom end elevation view of the electronic device 100, and provides an example illustration of the I/O interface 106 aperture. In some examples, the single-piece housing 102 can include no apertures. In other examples, the single-piece housing 102 can include any predetermined number of apertures to accommodate, buttons, speakers, microphones, and/or other component interfaces.

In the illustrated example, one or more button(s) 108 can be incorporated as internal components of the electronic device 100, possibly beneath the surface of the single-piece housing 102. In this example, the one or more button(s) 108 may not be externally visible. In some examples, the one or more button(s) 108 can control features of the electronic device 100 and can be activated by applying pressure to an overlapping region of the single-piece housing 102. For example, the single-piece housing 102 can be fabricated from flexible polyurethane foam that is malleable when pressure is applied. By applying pressure to a region of the single-piece housing 102 that overlaps the one or more button(s) 108, the features controlled by the one or more button(s) 108 can be activated.

In the illustrated example, one or more light emitting diodes (LEDs) 110 can be included as internal components of the electronic device 100. In this example, the polymer material can include an additive that provides a predetermined level of translucency such that an LED 110 that is located underneath the external surface of the single-piece housing 102, can emit light that is visible outside the single-piece housing 102.

Figure 1C:
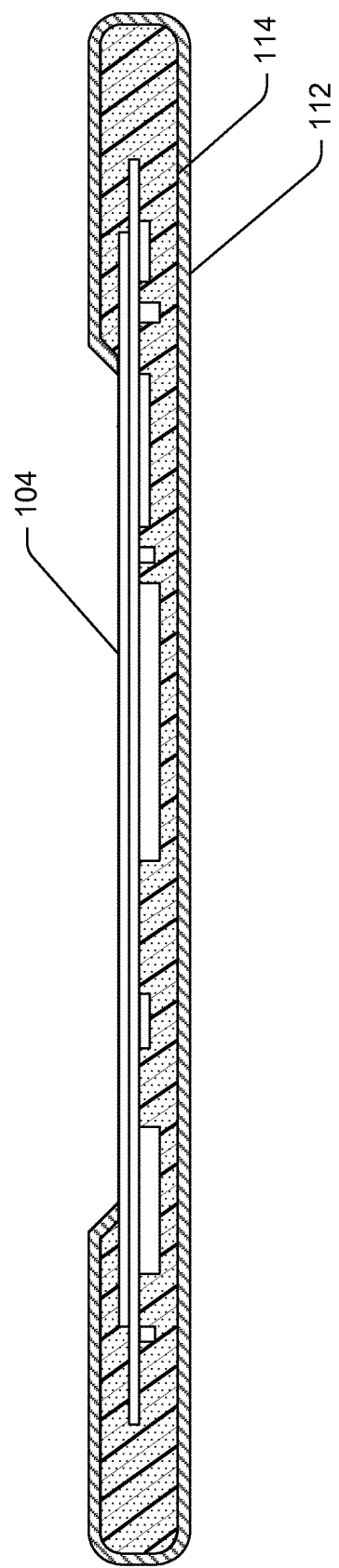

FIG. 1C illustrates a cross-section view through Section A-A of FIG. 1A and illustrates the self-skinning properties of a polymer material. In some examples, the polymer material can comprise of a self-skinning polyurethane foam that retains a high-density outer-skin layer 112 and a low-density core 114. In some examples, the high-density outer-skin layer 112 can provide at least some impact resistance as well as water resistance. The low-density core 114 can further reduce the overall weight of the single-piece housing 102, making it conducive to at least some level of buoyancy.

Figure 2B:
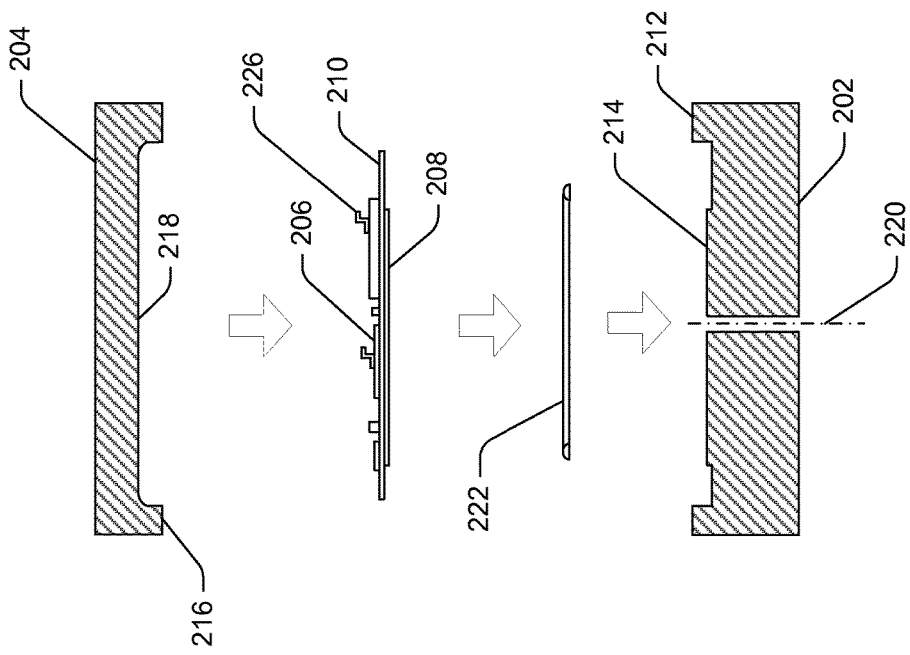
FIGS. 2A, 2B, and 2C illustrate an example configuration of fabricating a product enclosure using the foam over-mold process.
Figure 2A:
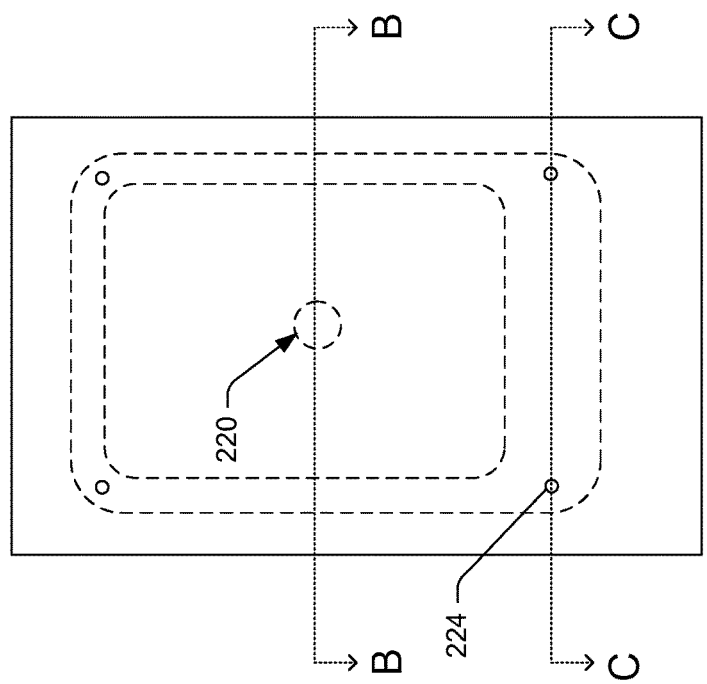

FIGS. 2A and 2B illustrate an example configuration of using an injection molding process to fabricate an air-tight single-piece housing of an electronic device. In various examples, the fabrication process involves injecting a polymer material into a mold enclosure that is formed by a first mold tool 202 and a complementary second mold tool 204. In the illustrated example, internal components 206 of an electronic device can be positioned within the mold enclosure. The fabrication process can subsequently create a single-piece housing that physically connects with exposed surfaces of the internal components 206.

In the illustrated example, the internal components 206 of the electronic device can include a printed circuit board, various electronic components, a battery, a display screen 208, and a physical structure 210. In some examples, the internal components 206 can be physically coupled together using an adhesive. In other examples, the internal components 206 can be physically coupled together using the physical structure 210.

In various examples, the physical structure 210 can be fabricated from a metallic alloy such as aluminum. In other examples, the physical structure 210 can be fabricated using an epoxy-based polymer. The physical structure 210 can include stiffening members to improve the structural rigidity. In various examples, as depicted in FIG. 2B, the display screen 208 can be physically coupled to one face of the physical structure 210, while the internal components 206 can be physically coupled to the opposing face of the physical structure 210.

In the illustrated example, a mold enclosure is formed by the physical connection of a first mold tool 202 and a second mold tool 204. FIG. 2B illustrates an exploded view of the internal components of the electronic device being positioned within the mold enclosure. The first mold tool 202 can include a mating surface 212 and a first cavity surface 214. In various examples, the mating surface 212 can physically connect with a corresponding mating surface 216 of a second mold tool 204 to form a sealed, mold enclosure.

In some examples, the first cavity surface 214 and second cavity surface 218 of each respective mold tool 202 and 204 can be contoured to create a respective surface profile of the single-piece housing. For example, any contour, texture, or logo that is imprinted on the first cavity surface 214 of the first mold tool 202 can be mirrored to the same surface profile of the single-piece housing. In the illustrated example, the first cavity surface 214 of the first mold tool 202 is contoured to create a front panel profile of an electronic device. Similarly, the second mold tool 204 can include a second cavity surface 218 that is contoured to mirror a back panel of the electronic device.

In various examples, the first mold tool 202 can include one or more access apertures 220. The one or more access apertures 220 can be used to align a projecting side of the display screen 208 and/or internal components 206 on the first cavity surface 214 of the first mold tool 202. As used herein, the term 'projecting side' of the display screen 208 describes the side of the display screen that displays content. In various examples, an adhesive spray can be applied to the first cavity surface 214 of the first mold tool 202 to help align the display screen 208 and/or internal components 206.

In various examples, a seal 222 can be used to prevent polymer material from forming over regions that are intended for apertures, such as a display screen 208 area. In the illustrated example, a seal 222 can be placed over the raised area of the first cavity surface 214 that corresponds to the display screen 208. In this non-limiting example, the seal 222 can act as a shutoff that prevents polymer material from forming over the display screen area. In some examples, the seal 222 can have a predetermined width and extend only along peripheral edges of the intended aperture. In other examples, the seal 222 can form a cover over the entire aperture area.

In other examples, polymer material can be prevented from forming over regions that are intended for apertures by applying a suction force through the one or more access apertures 220. In the illustrated example, a suction force can cause a physical connection between the display screen 208, the seal 222, and the first cavity surface 214 of the first mold tool 202. In this example, the forced physical connection can create a barrier that helps prevent polymer material from flowing over the projecting side of the display screen 208 that is intended to display content. In some examples, the suction force can be applied and maintained throughout the injection molding process. In some examples, the suction force can be applied and maintained in combination with an adhesive spray to help hold the display screen 208 in place.

Once the internal components 206 are aligned on the first cavity surface 214 of the first mold tool 202 and the mold enclosure is formed by the physical connection of the two mold tools 202 and 204, the polymer material can be injected into the mold enclosure to create the single-piece housing. In some examples, the polymer material can create a backing that covers the internal components 206 of the electronic device by filling voids surrounding the internal components 206 and adopting the texture of the second mold tool 204 cavity surface 218.

Figure 2C:
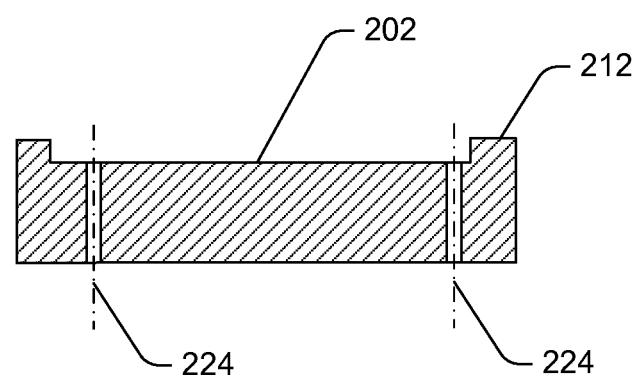

In various examples, the polymer material can be injected into the mold enclosure at a high pressure and possibly at or near room temperature. The high pressure injection can cause the polymer material to fill exposed voids within the mold enclosure. In some examples, one or more pressure release vents 224 can be incorporated into at least one of the mold tools 202 and 204 to relieve pressure within the mold enclosure during the injection molding process. For example, since the polymer material can be injected into the mold enclosure at a high pressure, a risk exists that a buildup of pressure can cause damage to the internal components 206 of the electronic device. Subsequently, as depicted in FIG. 2A and FIG. 2C, one or more pressure release vents 224 can be incorporated into the mold tools 202 and 204 to allow air, gas or polymer material to escape outside of the mold enclosure when the pressure buildup exceeds a predetermined threshold. In some examples, the one or more pressure release vents 224 can be calibrated to release air, gas or polymer material in response to pressure with the mold enclosure exceeding a predetermined pressure threshold. In various examples, the one or more pressure release vents 224 can extend from the cavity surfaces 214 and 218 of the mold tools 202 and 204 to the exterior face of that same mold tool 202 and 204.

In the illustrated example, the polymer material can fill voids surrounding the internal components 206 except for the display screen 208 area where a barrier has been created by at least one of a seal 222 or suction force that is generated through the one or more access apertures 220. The resulting single-piece housing can comprise of polymer material that physically connects to all internal components except for intended apertures, such as the display screen area.

In various examples, several different methods can be implemented to provide a good physical connection between the polymer material and the internal components 206 of the electronic device. In one example, interlocks 226 can be used to improve upon a physical connection between the polymer material and the internal components 206. For example, interlocks 226 can be positioned at various locations that overlay the internal components 206. The interlocks 226 can prevent the polymer material from peeling away by capturing portions of the polymer material. In the illustrated example, interlocks 226 can include flanged Z-sections that capture portions of the polymer material at an edge of the flanged sections. In other examples, the interlocks 226 can comprise of various other shaped-sections that capture portions of the polymer material.

In another example, an adhesive spray can be applied to exposed surfaces of the internal components 206 to provide an improved physical connection with the polymer material. In some examples, the adhesive spray can also help maintain a physical connection between the polymer material and the internal components 206 when the internal components 206 are expanding due to heat. For example, heat generated by the internal components 206 under normal operating conditions can cause the internal components 206 to expand at a predetermined thermal expansion rate that is likely different to that of the polymer material. The effect of having different thermal expansion rates is that the polymer material can peel away from an interface with the internal components 206. By coating the internal components 206 with an adhesive spray, the adhesive spray can provide a shearing interface between the internal components 206 and the polymer material, thereby reducing the likelihood of the polymer material peeling away.

In some examples, copper film can be used to expel thermal radiation away from the internal components 206 towards a side wall of the single-piece housing. In various examples, the copper film can overlay an exposed surface of the internal components 206 prior to injecting the polymer material into the mold enclosure. The copper film can conduct heat away from the internal components to edges of the single-piece housing, thus preventing the internal components 206 from overheating.

In other examples, a thermal additive can be added to the polymer material prior to performing the injection molding process. In some examples, the thermal additive can conduct heat away from the internal components 206 to an external face of the single-piece housing.

In various examples, a ferrite sheet can be used for electromagnetic interference (EMI) suppression. In some examples, EMI can interrupt, obstruct or otherwise degrade the effective performance of the internal components 206. The ferrite sheet can suppress EMI noise and prevent any subsequent resonance within the internal components 206. In some examples, the ferrite sheet can overlay an exposed surface of the internal components 206 prior to injecting the polymer material into the mold enclosure.

In other examples, a ferrite powder can be added to the polymer material prior to performing the injection molding process. In some examples, the ferrite powder can provide EMI suppression that is substantially similar to that of a ferrite sheet.

In various embodiments, intentional voids or pockets of air can be contained within the mold enclosure to reduce an overall weight of the single-piece housing. For example, a pocket of air can be contained within a bladder and nestled within a vacant pocket of space at or near the internal components 206. In this example, the pocket of air creates an intentional void that reduces an amount of polymer material that can be injected into the mold enclosure. Thus, by reducing the amount of polymer material injected into the mold enclosure, the overall weight of the single-piece housing is proportionally reduced. In some examples, the bladder can be fabricated from a film material that can withstand the forces generated by the high pressure injection of the polymer material.

In various examples, the type of polymer material used to create the single-piece housing can provide varying levels of water resistance and buoyancy characteristics. For example, a polymer material, such as self-skinning polyurethane foam, can create a single-piece housing with a high-density outer-skin layer and a low-density inner core. In some examples, the high-density outer-skin layer can create a non-porous external surface, making the single-piece housing, at least to some extent, water resistant. A low-density inner core can mean that the single-piece housing remains relatively light over a given surface area, giving the single-piece housing at least to some buoyancy characteristics. Further, the inclusion of a non-porous outer-layer—that is part of the self-skinning polyurethane foam—can further improve buoyancy characteristics by preventing an absorption of moisture from the environment. An absorption of moisture can increase weight, which subsequently reduces buoyancy characteristics.

In various examples, additives can be mixed with the polymer material to cause changes to the polymer material. The additives can be added to the polymer material prior to performing the injection molding process, meaning that no additional manufacturing process or fabrication step, other than the inclusion of the additives, is required to modify the properties of the single-piece housing. The additives can affect properties of the polymer material such as, but not limited to, malleability, translucency, color, and scent of the single-piece housing.

Figure 3A:
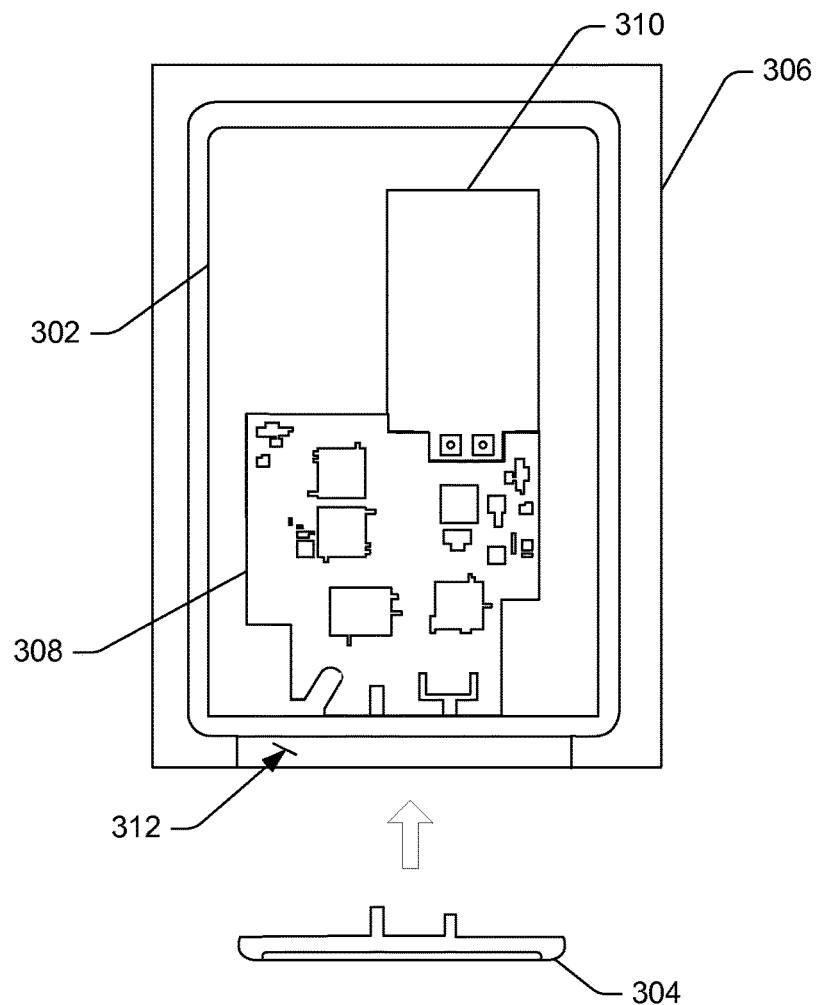
FIGS. 3A and 3B illustrate an example configuration of internal components of an electronic device, an input-output (I/O) interface component, and a first mold tool of the foam over-mold process.
Figure 3B:
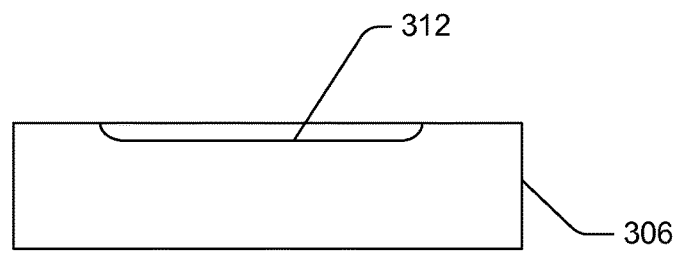

FIGS. 3A and 3B illustrate an example configuration of internal components 302 of an electronic device, a separate input-output (I/O) interface component 304, and the first mold tool 306. In various examples, the internal components 302 can include at least a printed circuit board that includes electronic components 308 and a battery 310. In some examples, the I/O interface component 304 can include one or more I/O port cavities that correspond to inputs ports for various input devices. Input devices can include, but are not limited to, headphones, peripheral speakers, a peripheral display, and a port to charge the battery 310.

In various examples, prior to carrying out the injection molding process, the I/O interface component 304 can be physically and communicatively coupled to the electronic components 308 of the electronic device.

In some examples, the electronic components 308 and the I/O interface component 304 can be positioned within the first mold tool 306. The I/O interface component 304 can be aligned with a recess 312 of the first mold tool 306. Note that a complementary second mold tool that is physically connected to the first mold tool 306 to form the mold enclosure also includes a recess that corresponds to recess 312. The recess 312 is sized to accommodate the physical geometry of at least a portion of the I/O interface component 304. In at least one example, the recess 312 can accommodate the physical geometry of I/O port cavities on the I/O interface component 304. The purpose of the recess 312 is to ensure that the external surface of the I/O interface component 304 is outside the mold enclosure formed by the first mold tool 306 and the complementary second mold tool. In doing so, the polymer material can be prevented from covering the external surface of I/O port cavities on the I/O interface component 304.

In some examples, the external surface of the I/O interface component 304 can be sealed prior to performing the injection molding process. Sealing the external surface of the I/O interface component 304 ensures that the mold enclosure that is formed by the mold tools is completely enclosed during the injection molding process. Therefore, any risk of polymer material escaping through I/O port cavities at the physical connection between the I/O interface component 304 and the electronic components 308 is eliminated. In various examples, the seal can be formed by a gasket material. In other examples, the seal can be formed by hot glue or silicon.

In some embodiments, a laser ablation process or chemical ablation process can be used as an alternative to incorporating a recess 312 in the first mold tool 306 and a recess in a complementary second mold tool. In some examples, the internal components 302 and the I/O interface component 304 can be fully positioned within the mold enclosure. During the injection molding process, the polymer material can be injected into the mold enclosure to fill voids surrounding the internal components 302 and the I/O interface component 304, including the I/O port cavities. After the injection molding process is complete and the single-piece enclosure is formed, a laser ablation process or a chemical ablation process can be used to remove polymer material from regions that correspond to I/O port cavities.

In some examples, the I/O interface component 304 can be eliminated by incorporating electronic components 308 that support near field communication (NFC) and wireless charging. By doing so, the electronic device excludes physical ports to interface with peripheral devices. Instead, a communicative connection can be established via NFC and the battery 310 can be charged using wireless charging facilities. Therefore, the geometry of the first mold tool 306 can be simplified by excluding the recess 312 (as depicted in FIG. 3B) that facilitates the profile of the I/O interface component 304.

Figure 4A:
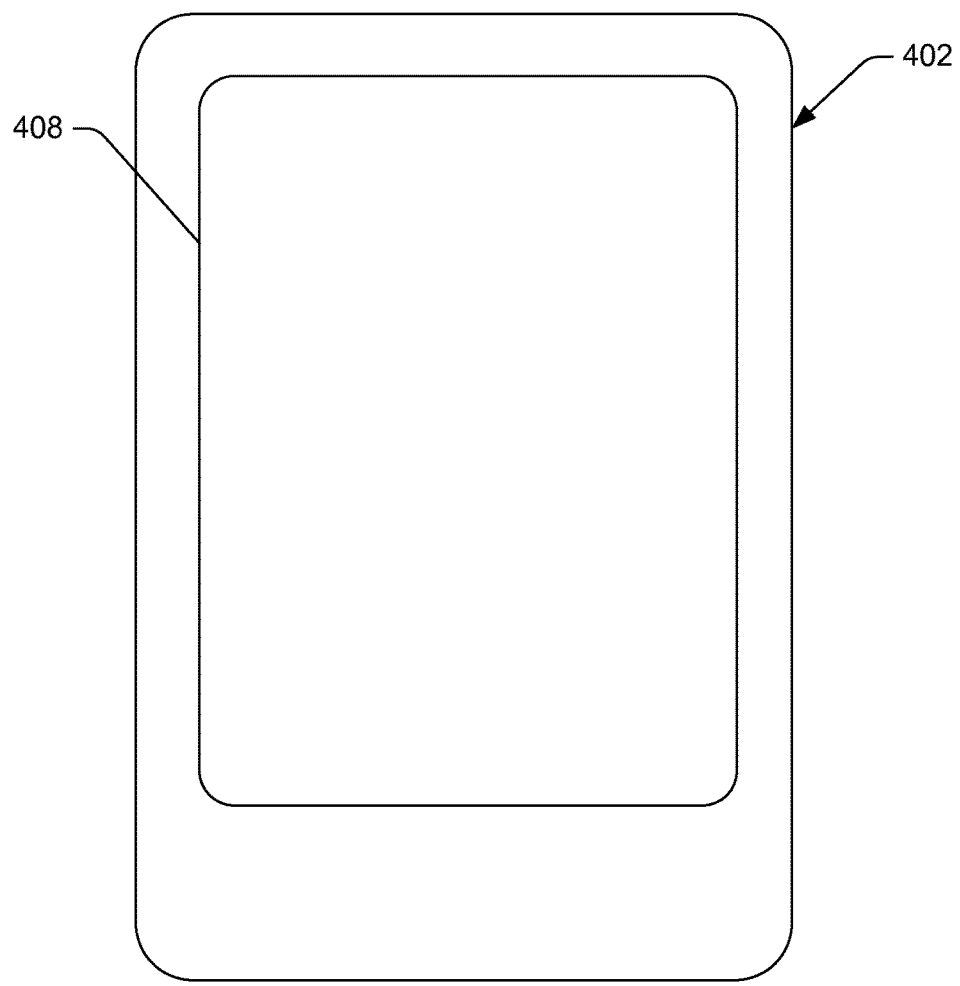
FIGS. 4A and 4B illustrate an example electronic device that includes an air-tight single-piece housing that comprising a molded part that interfaces with edges of a preconfigured bezel.
Figure 4B:
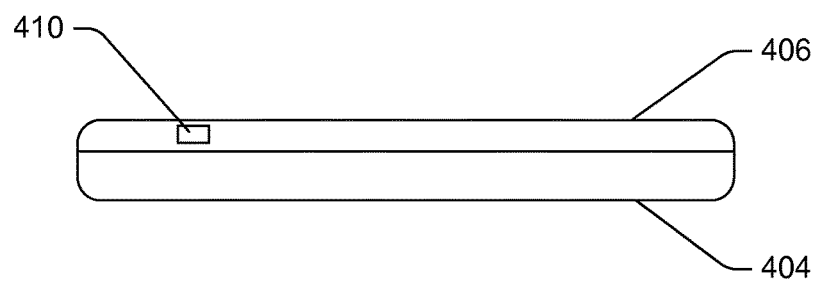

FIGS. 4A and 4B illustrate an example electronic device that includes an air-tight single-piece housing 402 that comprises of a molded part 404 that interfaces with edges of a preconfigured bezel 406. In some examples, the bezel 406 is preconfigured to couple with a display screen 408 and/or other internal components of an electronic device. The fabrication process of the single-piece housing 402 combines the molded part 404 with the preconfigured bezel 406 is discussed in more detail below in the detailed description corresponding to at least FIG. 5. FIG. 4A illustrates a top plan view of the single-piece housing 402 for an electronic device. The single-piece housing 402 can be used for an electronic device such as, but not limited to, a remote control, a mobile device, an electronic book reader, a tablet computer, a laptop computer, television unit, a portable GPS unit, or any other electronic device having a housing.

In the illustrated example, the single-piece housing 402 includes two apertures to accommodate a display screen 408 and an input/output (I/O) port 410. The I/O port 410 is intended to interface with a peripheral device such as, but not limited to, headphones, peripheral speakers, a peripheral display, and a port to charge a battery associated with the electronic device. In the illustrated example, the apertures are incorporated on the preconfigured bezel 406 rather than the molded part 404. In other embodiments, the molded part 404 can include at least one aperture.

Figure 5A:
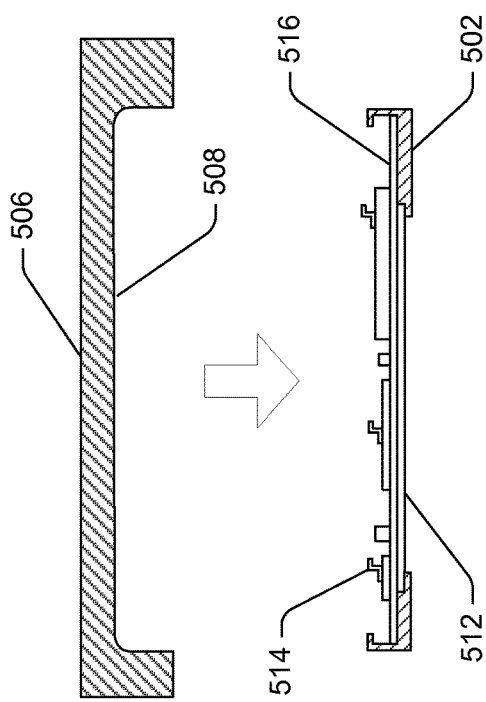
Figure 5A:
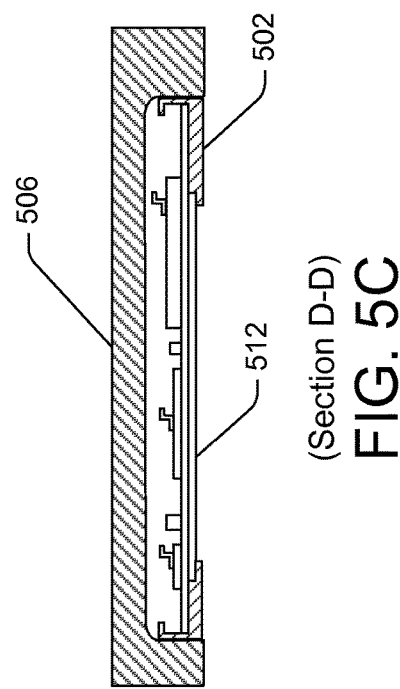
Figure 5A:
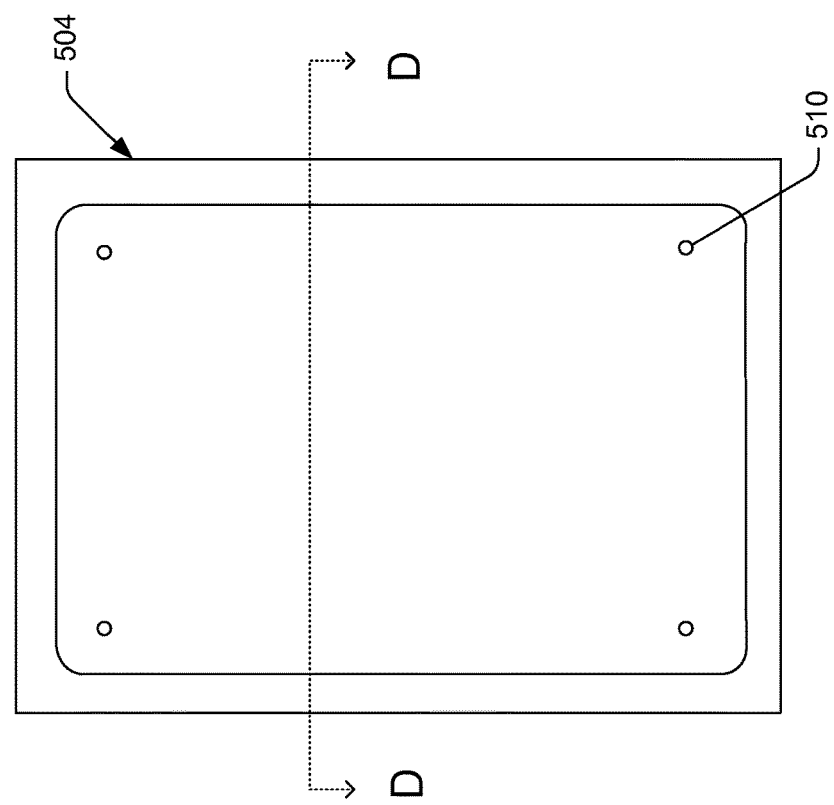

FIGS. 5A, 5B, and 5C illustrate an example configuration of using an injection molding process to fabricate an air-tight single-piece housing that combines a bezel 502 and a molded part. In various examples, the fabrication process involves injecting a polymer material into a mold enclosure 504 that is formed by the bezel 502 and a mold tool 506. FIG. 5A illustrates a top view of the mold enclosure 504. The mold tool 506 includes a cavity surface 508 that is contoured to create an external backside profile of the single-piece housing. In some examples, the mold tool 506 is sized to fit over the bezel 502 such that a sealed mold enclosure is formed when the mold tool 506 interfaces with the bezel 502.

In some examples, the bezel 502 can include a front panel that is substantially planar with flanged edges along the periphery, as depicted in FIGS. 5B and 5C. The purpose of incorporating flanged edges on the bezel is three fold. First, the flanged edges can provide the single-piece housing with added structural rigidity such that additional internal support structure may not be included. Second, the flanged edges can act as an interlock to hold the polymer material in place and prevent peeling after the injection molding process has been performed. In various examples, interlocks are typically flanged sections that capture sections of the polymer material to prevent peeling. Third, the external surface of the bezel 502 flange can further act as a mating surface that physically connects with the mold tool 506, such that when the mold tool 506 and the bezel 502 interface, a sealed mold enclosure is formed.

In various examples, the bezel 502 can be formed or machined from an alloy such as, but not limited to, aluminum or titanium. In other examples, the bezel 502 can be fabricated using an epoxy-based polymer. In the illustrated example, the bezel 502 can include an aperture to accommodate a display screen 512 of an electronic device. In some examples, the bezel 502 can include additional apertures to accommodate one or more ports to interface with peripheral device(s). In other examples, the bezel 502 can include no apertures.

In some examples, interlocks 514 can be used to improve the physical connection between the polymer material and the internal components 516. For example, the interlocks 514 can prevent the polymer material from peeling away from the internal components 516 by capturing portions of the polymer material. In the illustrated example, the interlocks 514 can be positioned at various locations that overlay the internal components 516.

In the illustrated example, internal components 516 of the electronic device can be physically coupled to the bezel 502. In some examples, the internal components 516 can include, but are not limited to, a printed circuit board having various electronic components, a battery, and the display screen 512. In some examples, the internal components 516 can be physically coupled together using an adhesive to ensure proper alignment during the injection molding process. In various examples, as depicted in FIGS. 5B and 5C, the display screen 512 can be physically coupled to the bezel 502. In some examples, the internal components 516 are communicatively coupled together without being physically connected. Instead, a physical connection is accomplished by the polymer material injected into the mold enclosure 504. In this example, the polymer material covers exposed surfaces of the internal components 516, thereby physically connecting the internal components 516 together.

Prior to performing the injection molding process, the bezel 502 can be sealed to prevent an escape of polymer material during the fabrication process. For example, the peripheral edges of the display screen 512 can be physically coupled to the bezel 502 to create a seal. In various examples, the display screen 512 can be coupled to the bezel 502 using an adhesive. Further, one or more other apertures that have been incorporated on the bezel 502 can be sealed using an adhesive. Once the internal components 516 are positioned onto the bezel 502 and the mold enclosure 504 is formed by physically connecting the mold tool 506 and the bezel 502, the polymer material can be injected into the mold enclosure 504 to form the single-piece housing.

In various examples, the polymer material can be injected into the mold enclosure 504 at a high pressure possibly at or near room temperature. The high pressure injection can cause the polymer material to fill exposed voids within the mold enclosure 504 and adopt the texture of the cavity surface 508 of the mold tool 506. In the illustrated example, the polymer material can create a backing that covers the internal components 516 of the electronic device by filling voids surrounding the internal components 516, but for a projecting side of the display screen area, which is positioned outside of the mold enclosure 504. As a result, an air-tight, single-piece housing can be formed by combining the bezel 502 with the molded part.

In various embodiments, the polymer material used to form the molded part can comprise of an amorphous polymer, an elastomeric polymer or polyurethane foam. In some examples, the type of polymer material used can provide varying levels of water resistance and buoyancy characteristics. In various examples, additives can be mixed with the polymer material to cause changes to the polymer material, malleability, translucency, color, and scent.

In various examples, one or more pressure release vents 510 can be incorporated into the mold tool 506 to relieve pressure within the mold enclosure 504 during the injection molding process. For example, since the polymer material can be injected into the mold enclosure at a high pressure, a risk exists that a build of pressure within the mold enclosure 504 can cause damage to the internal components of the electronic device. Subsequently, one or more pressure release vents 510 can be fitted to the mold tool 506 to allow air, gas, or polymer material to escape the mold enclosure 504 in circumstances where the pressure buildup exceeds a predetermined threshold. In various examples, the pressure release vents 510 can extend from the cavity surface 508 of the mold tool 506 to the exterior face of the mold tool 506.

In some examples, an adhesive spray can be applied to exposed surfaces of the internal components 516 to provide an improved physical connection with the polymer material. In some examples, the adhesive spray can also help maintain a physical connection between the polymer material and the internal components 516 when the internal components 516 are expanding due to heat.

In various examples, a copper film can overlay the internal components 516 prior to injecting the polymer material. In some examples, the copper film can conduct heat away from the internal components 516 to an edge of the product enclosure. In other examples, a thermal additive can be added to the polymer material prior to performing the injection molding process. In some examples, the thermal additive can conduct heat away from the internal components 516 to an external face of the product enclosure.

In some examples, a ferrite sheet can be used for EMI suppression. The ferrite sheet can overlay an exposed surface of the internal components 516, thereby suppressing EMI noise and preventing any subsequent resonance within the internal components 516. In other examples, a ferrite powder can be added to the polymer material prior to performing the injection molding process to provide EMI suppression that is substantially similar to that of a ferrite sheet.

In some examples, to reduce an overall weight of the product enclosure, intentional voids, or pockets of air can be contained within one or more bladders that are nestled within vacant pockets of space at or near the region of the internal components 516. The pockets of air can create intentional voids that reduce an amount of polymer material that can be injected into the mold enclosure 504. Thus, an overall weight of the product enclosure can be reduced.

Figure 6:
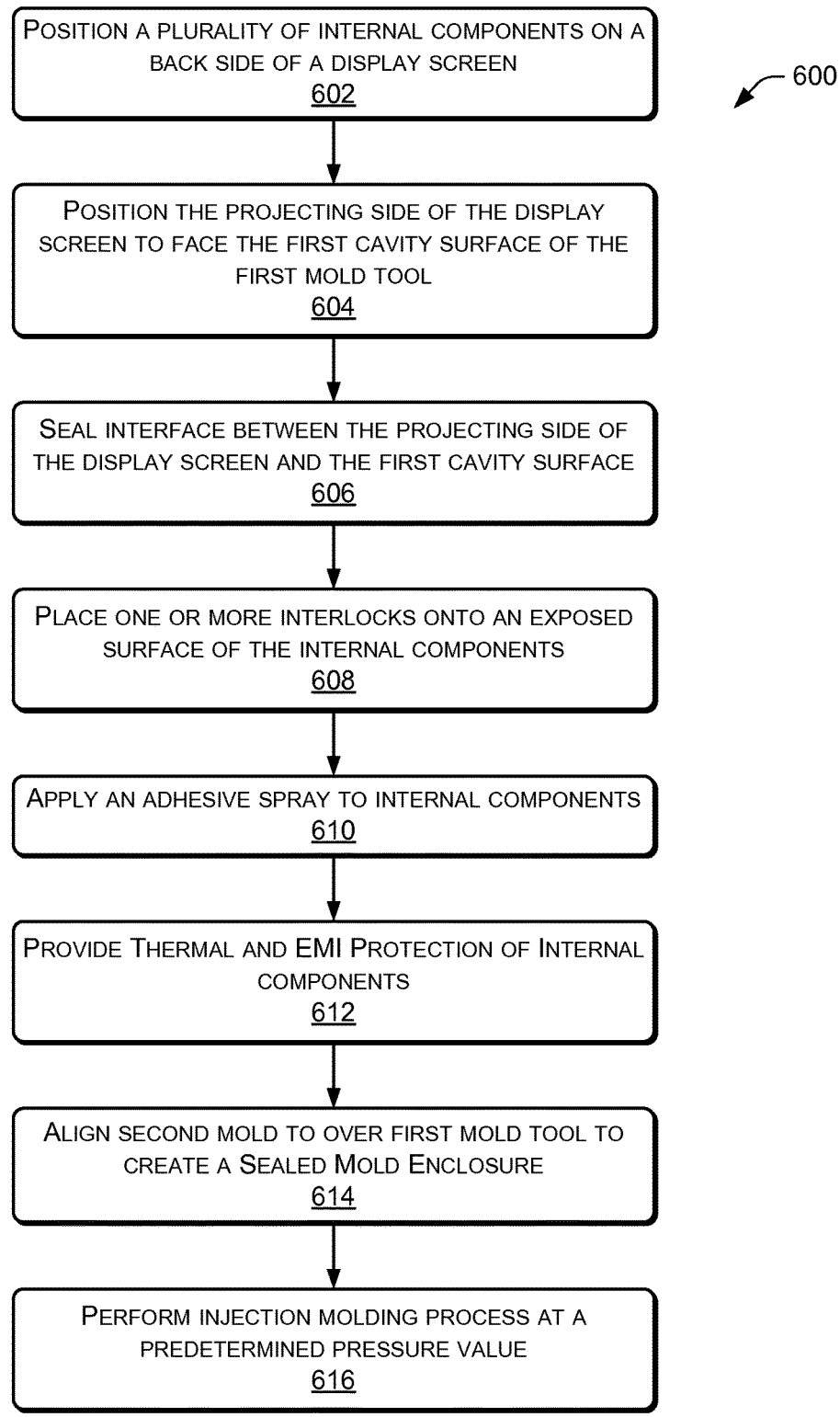
FIG. 6 is a flow diagram of an example process for performing the foam over-mold process.

FIG. 6 illustrates a flow diagram of an example process 600 for fabricating an air-tight single-piece housing that surrounds internal components of an electronic device. The fabrication process can involve performing an injection molding process into a mold enclosure formed by two mold tools. In some examples, the mating surface of a first mold tool can interface with a corresponding mating surface of complementary mold tool to form a sealed, mold enclosure. In various embodiments, the polymer material can comprise of an amorphous polymer, an elastomeric polymer or polyurethane foam. In various examples, additives can be mixed with the polymer material to cause changes to the polymer material, malleability, translucency, color, and scent.

At 602, a sub-assembly of internal components can be positioned onto a back side of a display screen. The internal components can include, but are not limited to, circuit board, input/output interfaces, a battery, and other internal components of an electronic device. The internal components can be secured together as an assembly using a suitable adhesive. In an alternate embodiment, the internal components can be secured together via a separate internal structure. In some examples, the sub-assembly of internal components may not be physically connected to the back side of the display screen. Instead, only a communicative coupling may be formed. In this example, a physical connection between the sub-assembly of internal components and the display screen can be established by the polymer material that forms the single-piece housing.

At 604, the projecting side of a display screen can be positioned to face the cavity surface of a first mold tool. This arrangement facilitates the formation of a seal that prevents polymer material from forming over at least a portion of the projecting side of the display screen.

At 606, the interface between the projecting side of the display screen and the first cavity surface of the first mold tool is sealed. The purpose of sealing this interface is to create a shutoff that prevents polymer material from forming over a portion of the projecting side of the display screen. In some examples, a physical seal can be placed between the projecting side of the display screen and the first cavity surface of the first mold tool. In other examples, the interface between the display screen and the first cavity surface can be created by a suction force applied via an access aperture on the first mold tool. The suction force can hold the projecting side of the display screen in place during the injection molding process, thereby creating a shutoff that prevents polymer material from forming over a portion of the projecting side of the display screen.

At 608, one or more interlocks can be placed at various locations that overlay exposed surface of the sub-assembly of internal components. In some examples, the interlocks can prevent the polymer material from peeling away from the sub-assembly of internal components by capturing portions of the polymer material.

At 610, an adhesive spray can be applied to the sub-assembly of internal components. In various examples, the adhesive spray can be applied to exposed surfaces of the sub-assembly of internal components to provide an improved physical connection with the polymer material. In some examples, the improved physical connection can help prevent the polymer material from peeling away from the sub-assembly of internal components.

At 612, thermal protection can be applied to the sub-assembly of internal components. In various examples, a thermal additive can be added to the polymer material to help conduct heat away from the sub-assembly of internal components to an external face of the single-piece housing. In other examples, a copper film can overlay the sub-assembly of internal components to expel thermal radiation away towards a side wall of the single-piece housing.

In various examples, EMI suppression can be applied to the sub-assembly of internal components by including at least one of a ferrite sheet that overlays the sub-assembly of internal components, or adding ferrite powder to the polymer material prior to performing the injection molding process.

At 614, a second mold tool overlaps the first mold tool to create a sealed mold enclosure. In various examples, I/O interface ports can be sealed using an adhesive to ensure that a sealed mold enclosure is formed. In some examples, a mold enclosure can include an aperture that is complementary to a profile of an I/O interface component. In these examples, the aperture can be sealed to prevent polymer material from escaping the mold enclosure during the injection molding process.

At 616, the injection molding process is performed by injecting a polymer material into the mold enclosure. In various examples, the polymer material can be injected into the mold enclosure at a high pressure possibly at or near room temperature to fill voids surrounding the internal components of the electronic device. In some examples, the polymer material can fill voids but for sealed areas, such as I/O port interfaces and display screen areas. In some examples, pressure release vents can be incorporated into one of the mold tools to allow air, gas or polymer material to escape the mold ensure during the injection molding process. The pressure release vents can mitigate the risk of a pressure build up causing damage to internal components of the electronic device.

Figure 7:
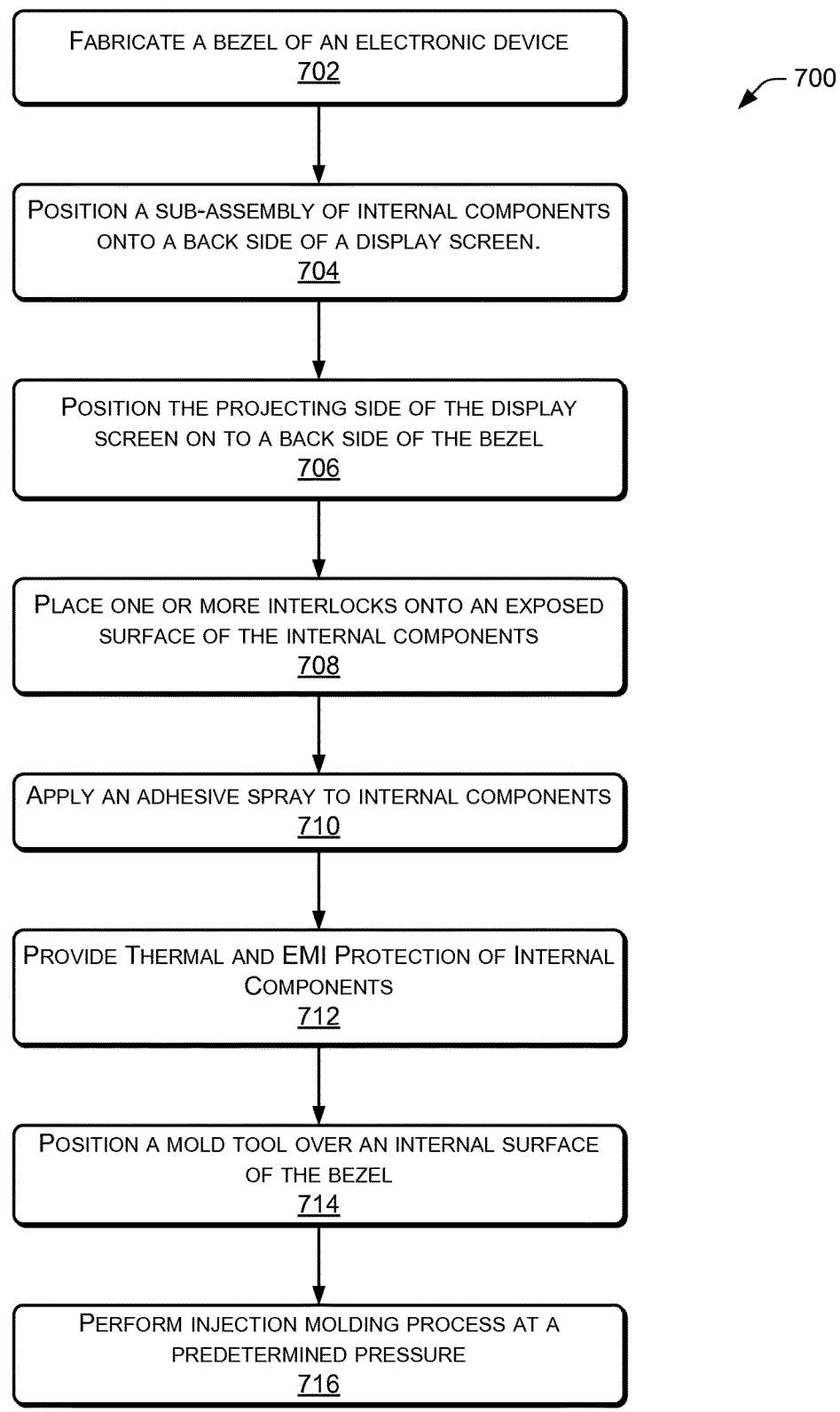
FIG. 7 is a flow diagram of an example process for performing the front bezel mold process.

FIG. 7 illustrates a flow diagram of an example process 700 of using an injection molding process to fabricate an air-tight single-piece housing that combines a preconfigured bezel with a molded part. The fabrication process can involve performing an injection molding process in a mold enclosure formed by a mold tool and the preconfigured bezel of an electronic device. In some examples, the mating surface of the mold tool can interface with a flange of the bezel to form the sealed, mold enclosure. In various examples, the polymer material can comprise of an amorphous polymer, an elastomeric polymer or polyurethane foam. In various examples, additives can be mixed with the polymer material to cause changes to the polymer material, structural rigidity, translucency, and color.

At 702, a bezel of an electronic device is fabricated. In various examples, the bezel can be formed or machined from an alloy such as aluminum, titanium, or an epoxy-based polymer. In some examples, the bezel can include a front panel that is substantially planar with flanged edges along peripheral edges. In various examples, the bezel can also include one or more apertures to accommodate at least one of a display screen of an electronic device or I/O ports to interface with peripheral devices.

At 704, a sub-assembly of internal components can be positioned onto a back side of a display screen. The internal components can include, but are not limited to, circuit board, input/output interfaces, a battery, and other internal components of an electronic device. The internal components can be secured together as an assembly using a suitable adhesive. In an alternate embodiment, the internal components can be secured together via a separate internal structure. In some examples, the sub-assembly of internal components may not be physically connected to the display screen. Instead, only a communicative coupling may be formed. In this example, a physical connection between the sub-assembly of internal components and the display screen can be established by the polymer material that forms the single-piece housing.

At 706, the projecting side of a display screen is positioned to face the back side of the bezel. In various examples, the perimeter of the display screen can be coupled to the bezel using an adhesive. At 708, one or more interlocks can be placed at various locations that overlay exposed surface of the sub-assembly of internal components. In some examples, the interlocks can prevent the polymer material from peeling away from the sub-assembly of internal components by capturing portions of the polymer material.

At 710, an adhesive spray can be applied to the sub-assembly of internal components. In various examples, the adhesive spray can be applied to exposed surfaces of the sub-assembly of internal components to provide an improved physical connection with the polymer material. In some examples, the improved physical connection can help prevent the polymer material from peeling away from the sub-assembly of internal components.

At 712, thermal protection can be applied to the sub-assembly of internal components. In various examples, a thermal additive can be added to the polymer material to help conduct heat away from the sub-assembly of internal components to an external face of the single-piece housing. In other examples, a copper film can overlay the sub-assembly of internal components to expel thermal radiation away towards a side wall of the single-piece housing.

In various examples, EMI suppression can be applied to the sub-assembly of internal components by including at least one of a ferrite sheet that overlays the sub-assembly of internal components, or adding ferrite powder to the polymer material prior to performing the injection molding process.

At 714, a mold tool is positioned over an internal face of the bezel. In various examples, the external surface of the bezel flanges can act as a mating interface to a mold tool. Therefore, when the mold tool is positioned over the bezel, the interaction between the bezel flanges and the mold tool can form a sealed mold enclosure.

At 716, the injection molding process is performed by injecting a polymer material into the mold enclosure. In various examples, the polymer material can be injected into the mold enclosure at a high pressure possibly at or near room temperature to fill voids surrounding the internal components of the electronic device. In some examples, the polymer material can fill voids but for sealed areas, such as I/O port interfaces and display screen areas. In some examples, pressure release vents can be incorporated into one of the mold tools to allow air, gas or polymer material to escape the mold ensure during the injection molding process. The pressure release vents can mitigate the risk of a pressure build up causing damage to internal components of the electronic device.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrated forms of implementing the claims.

What is claimed is:

1. A method of forming a single-piece housing for an electronic device to securely contain and protect internal components of the electronic device, the method comprising:
   arranging a sub-assembly of internal components of the electronic device in a first mold, the first mold having a first cavity surface to receive the sub-assembly, the sub-assembly including at least a display screen oriented with a projecting side facing downward into the first cavity surface;
   aligning a second cavity surface of a second mold with the first cavity surface of the first mold to form a mold enclosure; and
   injecting a foam material into the mold enclosure to form the single-piece housing, the foam material filling voids surrounding the sub-assembly within the mold enclosure and creating a bezel surrounding a portion of the projecting side and creating a backing that covers the sub-assembly, the foam material comprising a self-skinning foam having an outer layer with a higher density than an inner layer.

2. The method of claim 1, wherein the first mold comprises an opposing second surface separated from the first cavity surface by a thickness of the first mold, wherein the first mold further comprises an aperture extending from the first cavity surface to the second surface, the aperture incorporating a pressure release vent, the method further comprising:
  determining that a pressure within the mold enclosure is greater than a predetermined pressure threshold; and
  opening the pressure release vent to release one of foam material, air, or gas from within the mold enclosure.

3. The method of claim 1, further comprising:
  positioning a seal between the projecting side of the display screen and the first cavity surface of the first mold, the seal preventing the foam material from covering the portion of the projecting side of the display screen.

4. The method of claim 1, further comprising:
  positioning, prior to injecting the foam material, a ferrite sheet over a portion of the sub-assembly, the ferrite sheet providing electromagnetic interference (EMI) suppression for the sub-assembly.

5. The method of claim 1, further comprising:
  applying, prior to injecting the foam material, an adhesive spray to the sub-assembly within the mold enclosure, the adhesive spray strengthening the physical connection between the foam material and the sub-assembly.

6. A method of fabricating a single-piece housing for an electronic device, the method comprising:
  positioning a sub-assembly of internal components of the electronic device in a first mold, the first mold having a first cavity surface contoured to receive the sub-assembly;
  forming, by aligning a second cavity surface of a second mold over the first cavity surface, a mold enclosure; and
  forming, by injecting at least a foam into the mold enclosure, the single-piece housing, the foam filling voids adjacent to the sub-assembly within the mold enclosure, the foam comprising a self-skinning foam with an outer layer having a higher density than an inner layer.

7. The method of claim 6, wherein the sub-assembly includes a display screen, the display screen having a projecting surface to display content and an opposing back surface, wherein positioning the sub-assembly further comprises:
  positioning the projecting surface to face the first cavity surface; and
  placing the sub-assembly onto the back surface of the display screen, wherein the sub-assembly is not physically connected to the back surface of the display screen.

8. The method of claim 6, further comprising:
  positioning, prior to injecting the foam, a copper film over a portion of the sub-assembly, the copper film dispersing thermal radiation from the sub-assembly to edges of the single-piece housing.

9. The method of claim 6, wherein the first mold includes an access aperture extending from the first cavity surface to an exterior surface of the first mold, the method further comprising:
  generating, via the access aperture, a suction force on the sub-assembly, the suction force causing the sub-assembly abut the first cavity surface of the first mold, wherein generating the suction force occurs during at least a portion of the injecting.

10. The method of claim 6, wherein the sub-assembly comprises an internal support structure, a display screen, and one or more electronic parts, and the method further comprising:
  physically coupling the one or more electronic parts to a surface of the internal support structure;
  physically coupling the display screen to the internal support structure; and
  communicatively coupling the display screen to at least one of the one or more electronic parts.

11. The method of claim 6, wherein the sub-assembly includes an input-output (I/O) interface component, the I/O interface component positioned at a perimeter of the sub-assembly, wherein the mold enclosure includes an aperture complementary to a profile of the I/O interface component, the aperture aligning with a position of the I/O interface component at the perimeter of the sub-assembly, the method further comprising:
  sealing the aperture to prevent the foam from escaping the mold enclosure during the injecting.

12. The method of claim 6, wherein the foam comprises a thermo-set polyurethane stable at room temperature, the method further comprising:
  injecting the foam into the mold enclosure at or near room temperature.

13. The method of claim 6, further comprising:
  adding, prior to injecting the foam, a thermal additive to the foam, the thermal additive dispersing thermal radiation from the sub-assembly to an external surface of the single-piece housing.

14. The method of claim 6, further comprising:
  placing one or more interlocks onto an exposed surface of the sub-assembly, the one or more interlocks including flanged sections providing a physical connection between the foam and the sub-assembly.

15. A method of fabricating a single-piece housing for an electronic device, the method comprising:
  positioning a sub-assembly of components of the electronic device in a first mold, the first mold having a first cavity surface sized to receive the sub-assembly, the sub-assembly including at least a display screen;
  positioning a seal between a projecting side of the display screen and the first cavity surface;
  forming, by positioning a second cavity surface of a second mold over the first cavity surface of the first mold, a mold enclosure; and
  injecting a foam into the mold enclosure to form the single-piece housing, the foam filling voids adjacent to the sub-assembly, the seal preventing the foam from covering at least a portion of the projecting side of the display screen, the foam having an outer layer with a density higher than an inner layer.

16. The method of claim 15, wherein the injecting causes the sub-assembly to be physically held together by the foam.

17. The method of claim 15, further comprising:
  selecting the foam so that the foam has a buoyancy that allows the electronic device to be buoyant.

18. The method of claim 15, wherein the sub-assembly includes at least one light emitting diode (LED), the foam having a predetermined level of translucency that allows light emitted from the at least one LED to be visible from an exterior surface of the single-piece housing.

19. The method of claim 15, further comprising:
  forming a bezel around peripheral edges of the display screen during the injecting.

20. The method of claim 15, further comprising:
  positioning, prior to injecting the foam, an air bladder within or near the sub-assembly.

\* \* \* \* \*